(12) United States Patent
Takahashi

(10) Patent No.: US 8,818,752 B2
(45) Date of Patent: Aug. 26, 2014

(54) BIOLOGICAL INFORMATION ACQUIRING SYSTEM AND BIOLOGICAL INFORMATION ACQUIRING METHOD

(75) Inventor: Akihisa Takahashi, Kyoto (JP)

(73) Assignee: Omron Healthcare Co., Ltd., Kyoto-Shi (JP)

( * ) Notice: Subject to any disclaimer, the term of this patent is extended or adjusted under 35 U.S.C. 154(b) by 748 days.

(21) Appl. No.: 13/155,773

(22) Filed: Jun. 8, 2011

(65) Prior Publication Data

US 2011/0238326 A1 Sep. 29, 2011

Related U.S. Application Data

(63) Continuation of application No. PCT/JP2009/007223, filed on Dec. 26, 2008.

(30) Foreign Application Priority Data

Dec. 26, 2008 (JP) ................. 2008-333402

(51) Int. Cl.
*A61B 5/11* (2006.01)
*G01G 19/50* (2006.01)
*G01G 23/16* (2006.01)

(52) U.S. Cl.
CPC ................. *G01G 19/50* (2013.01); *G01G 23/16* (2013.01)
USPC ............................... 702/160; 702/141; 482/8

(58) Field of Classification Search
CPC ..... G01G 23/16; G01G 19/50; A61B 5/1118; A61B 5/4866; A61B 2562/0219
USPC ...................... 702/56, 141, 160, 173; 482/8, 9
See application file for complete search history.

(56) References Cited

U.S. PATENT DOCUMENTS

| | | | |
|---|---|---|---|
| 2006/0064325 A1* | 3/2006 | Matsumoto et al. | ............... 705/3 |
| 2008/0287262 A1 | 11/2008 | Chou | |
| 2013/0325358 A1* | 12/2013 | Oshima et al. | ................... 702/19 |

FOREIGN PATENT DOCUMENTS

| | | |
|---|---|---|
| CN | 1723838 A | 1/2006 |
| JP | A-6-180379 | 6/1994 |
| JP | A-2001-245876 | 9/2001 |
| JP | A-2006-136422 | 6/2006 |
| JP | B2-4064426 | 1/2008 |
| JP | A-2008-142258 | 6/2008 |
| WO | WO 2008/068970 A1 | 6/2008 |

OTHER PUBLICATIONS

Nov. 1, 2012 Chinese Office Action issued in Chinese Application No. 200980152924.0 (with translation).
International Search Report issued in International Application No. PCT/JP2009/007223 on Mar. 9, 2010 (with translation).

* cited by examiner

Primary Examiner — Manuel L Barbee
(74) Attorney, Agent, or Firm — Oliff PLC

(57) ABSTRACT

It is an object of the present invention to provide a biological information acquiring system and a biological information acquiring method capable of enhancing the calculation accuracy to more accurately calculate the exercise effect information, and capable of enhancing the satisfaction level of the user.

In a biological information acquiring system, a body composition meter is configured to acquire pre-exercise body composition data measured before start of exercise and post-exercise body composition data measured after end of exercise. A pedometer is configured to acquire vibration data during exercise. The consumed calorie of the user can be more accurately calculated by arranging consumed calorie correction coefficient acquiring unit for acquiring a consumed calorie correction coefficient α based on the pre-exercise body composition data, the post-exercise body composition data, and the vibration data; and a consumed calorie calculation unit for calculating the consumed calorie using the consumed calorie correction coefficient α.

7 Claims, 10 Drawing Sheets

Fig. 7

Message data stored in pedometer

| Change in weight | Change in amount of exercise | Message |
|---|---|---|
| Increase | Increase | Overeating? Careful with eating amount. |
| | Maintain | Overeating? Careful with eating amount. |
| | Decrease | Amount of exercise dropped, and weight is increasing, consciously carry out exercise. |
| Maintain | Increase | Body is in energy saving mode. Continue with exercise. |
| | Maintain | Body is in energy saving mode. Continue with exercise. |
| | Decrease | Body is in energy saving mode. Continue with exercise. |
| Decrease | Increase | Weight is steadily dropping. Continue to keep up good work. |
| | Maintain | Weight is steadily dropping. Continue to keep up good work. |
| | Decrease | Weight is steadily dropping. Continue to keep up good work. |

Fig. 8
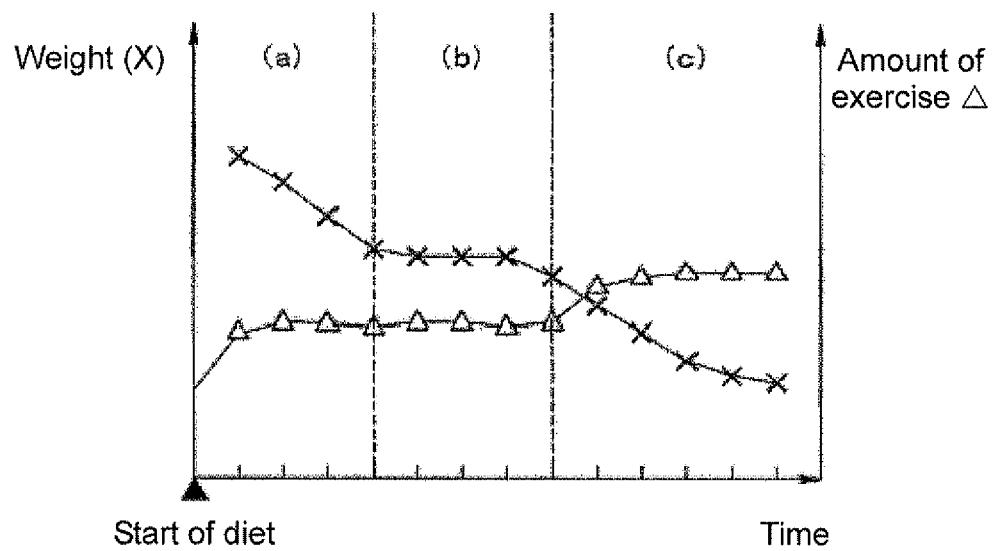
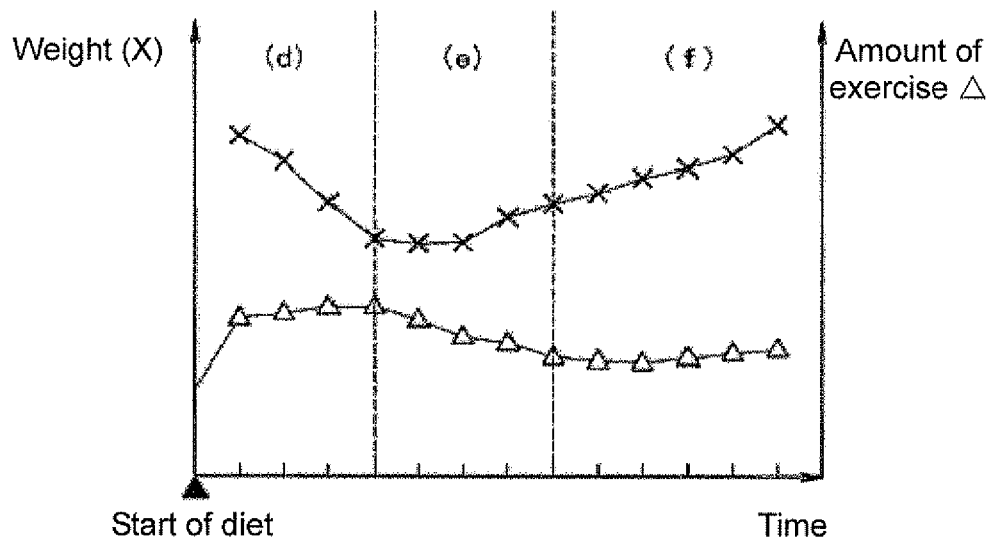

BIOLOGICAL INFORMATION ACQUIRING SYSTEM AND BIOLOGICAL INFORMATION ACQUIRING METHOD

TECHNICAL FIELD

The present invention relates to a biological information acquiring system and a biological information acquiring method used to calculate accurate information of exercise effect information.

BACKGROUND ART

An initial setting by a user is conventionally required to measure consumed calories with a pedometer. In the initial setting stage, body composition information such as weight, height, age, and sex need to be input. That is, a usual calculation method of calculating a base metabolic amount based on the initially set weight, height, age, and sex, and adding the consumed calories by walking to calculate the consumed calories is known. However, the consumed calories are statistically calculated from information such as height, weight, and age, and thus the value of the consumed calories greatly differs if the weight and the body composition of the user differ. Furthermore, since the weight and the body composition of the user fluctuate daily, if the consumed calories are calculated based on the initially set weight, the error in the numerical value to be calculated is large and the accurate consumed calories cannot be calculated with the statistical calculation method.

An exercise consumption energy estimating device of patent document 1 is proposed as a device for calculating energy such as the consumed calories. This document describes easily obtaining the exercise consumption energy at high accuracy when obtaining the exercise consumption energy by taking into consideration the body composition information that greatly acts on the fluctuation of the exercise consumption energy. In particular, it describes having body motion information as acceleration, body specifying information as weight, age, and sex, body composition information as fat free mass, muscle mass, fat mass, body moisture mass, and body cell mass. However, the weight and the body composition of the user fluctuate daily, similar to the above description, and hence the accurate consumed calorie cannot be calculated.

Patent Document 1: Japanese Patent Publication No. 4064426

DISCLOSURE OF THE INVENTION

Problems to be Solved by the Invention

In view of the above problems, it is an object of the present invention to provide a biological information acquiring system and a biological information acquiring method capable of enhancing the calculation accuracy to more accurately calculate the exercise effect information.

Means for Solving the Problem

According to the present invention, there is provided a biological information acquiring system including an amount of exercise measurement device with vibration data acquiring means for acquiring vibration data in which vibration by body motion is detected, and a weight and body composition meter with weight and body composition acquiring means for acquiring weight and body composition, wherein the weight and body composition meter is configured to acquire pre-exercise weight and body composition data measured before start of exercise and post-exercise weight and body composition data measured after end of exercise; the amount of exercise measurement device is configured to acquire the vibration data during exercise; and the biological information acquiring system further includes: calculation means for calculating exercise effect information indicating effect of exercise based on the pre-exercise weight and body composition data, the post-exercise weight and body composition data, and the vibration data.

The exercise effect information is configured by consumed calorie, change in body composition before and after exercise, change in weight before and after exercise, and the like.

According to the present invention, the exercise effect information can be more accurately calculated.

According to an aspect of the present invention, the biological information acquiring system further includes: storage means for storing different messages by change in the amount of exercise and by change in body composition in correspondence with the exercise effect information calculated by the calculation means; selection means for selecting a message corresponding to change in the amount of exercise and the body composition from the storage means; and output means for outputting the message selected by the selection means.

Therefore, an appropriate advice can be offered to the user, and an appropriate exercise can be carried out by looking at the message output by the output means.

Further, according to an aspect of the present invention, in the biological information acquiring system, the exercise effect information is consumed calorie consumed in the exercise; and the biological information acquiring system further includes: consumed calorie correction coefficient acquiring means for acquiring a consumed calorie correction coefficient based on the pre-exercise weight and body composition data, the post-exercise weight and body composition data, and the vibration data, and consumed calorie calculation means for calculating the consumed calorie using the consumed calorie correction coefficient.

Therefore, the consumed calorie can be more accurately calculated.

Further, according to an aspect of the present invention, the biological information acquiring system further includes: input means for permitting input of a target value corresponding to the exercise effect information; and amount of exercise calculation means for calculating an amount of exercise corresponding to the target value.

Therefore, the amount of exercise necessary to reach or maintain the target value can be accurately grasped.

Further, according to the present invention, there is provided a biological information acquiring method including an amount of exercise measurement device with a vibration data acquiring means for acquiring vibration data in which vibration by body motion is detected, and a weight and body composition meter with weight and body composition acquiring means for acquiring weight and body composition; the biological information acquiring method including the step of: calculating with calculation means exercise effect information for calculating exercise effect information indicating effect of exercise based on pre-exercise weight and body composition data measured before start of exercise and post-exercise weight and body composition data measured after end of exercise acquired by the weight and body composition meter, and vibration data during exercise acquired by the amount of exercise measurement device.

Therefore, the exercise effect information such as consumed calorie, change in body composition before and after exercise, and change in weight before and after exercise can be more accurately calculated.

According to an aspect of the present invention, the biological information acquiring method further includes the steps of: storing in storage means different messages by change in the amount of exercise and by change in body composition in correspondence with the exercise effect information calculated by the calculation means; selecting with a selection means a message corresponding to change in the amount of exercise and the body composition stored in the storage means; and outputting with output means the message selected by the selection means.

Therefore, an appropriate advice can be offered to the user, and an appropriate exercise can be carried out by looking at the message output by the output means.

Further, according to an aspect of the present invention, the biological information acquiring method further includes the steps of: permitting with input means input of a target value corresponding to the exercise effect information; and calculating with amount of exercise calculation means an amount of exercise corresponding to the target value.

Therefore, the amount of exercise necessary to reach or maintain the target value can be accurately grasped.

The body composition may be configured by weight, height, age, sex, muscle percentage, fat percentage, or the like. The amount of exercise measurement device may be configured with a pedometer or an exercise amount meter.

Effect of the Invention

According to the present invention, the calculation accuracy can be enhanced to more accurately calculate the exercise effect information. The satisfaction level of the user can also be enhanced.

BRIEF DESCRIPTION OF THE DRAWINGS

FIG. 7 is an explanatory view showing message data stored in the pedometer.
FIG. 8 is a graph showing the change in weight measured in the past and the amount of exercise.

BEST MODE FOR CARRYING OUT THE INVENTION

EXAMPLE

Figure 1:
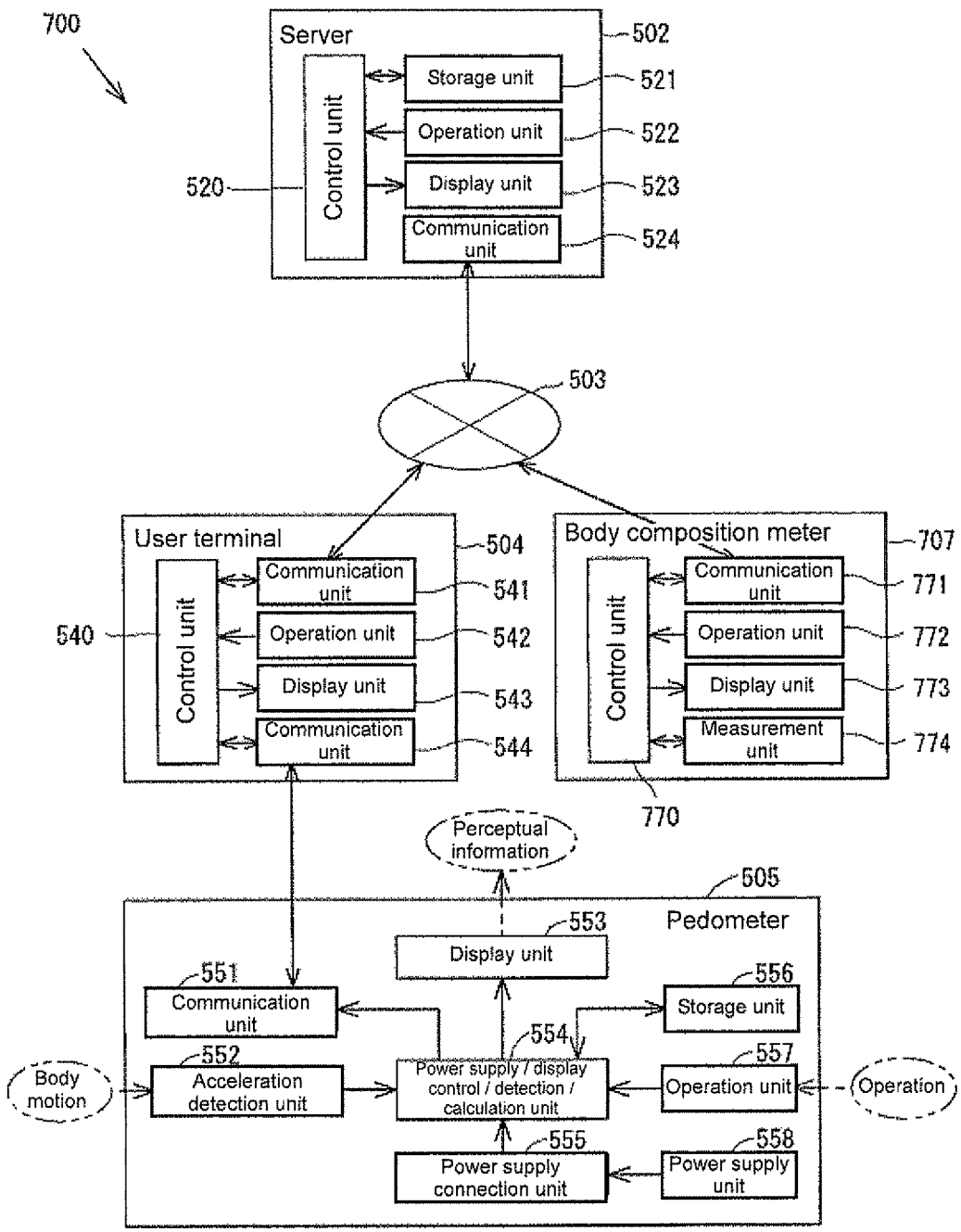
FIG. 1 is a block diagram showing a system configuration of a biological information acquiring system.

FIG. 1 is a block diagram showing a system configuration of a biological information acquiring system 700.

The biological information acquiring system 700 is configured by a server 502, a user terminal 504, and a body composition meter 707 connected to the Internet 503 by wire or wirelessly, and a pedometer 505 connected a the user terminal 504 by wire or wirelessly.

The server 502 is an appropriate computer used as a server device, and includes a control unit 520, a storage unit 521, an operation unit 522, a display unit 523, a communication unit 524, or the like. The communication unit 524 is configured by an appropriate communication device such as a wire line connecting LAN board or a wirelessly communicating wireless LAN board.

The server 502 receives data from the pedometer 505 through the user terminal 504 and displays an output screen based on such data on the display unit 523 by the operation of the operation unit 522 by an attendant.

The user terminal 504 is configured by, for example, a personal computer, and includes a control unit 540, a communication unit 541 an operation unit 542, a display unit 543, a communication unit 544. The communication unit 541 is configured by an appropriate communication device such as a wire line connecting LAN board or a wirelessly communicating wireless LAN board. The communication unit 544 is configured by an appropriate communication interface such as a wire line connecting USB (Universal Serial Bus) or a wirelessly communicating Bluetooth (registered trademark).

The user terminal 504 has a function of acquiring data from the pedometer 505 through the communication unit 544 and displaying graphs and tables based on such data, and a function of transmitting such data to the server 502.

The user terminal 504 is not limited to a personal computer, and may be configured by an appropriate device such as being configured with a portable information processing device including a PDA (Personal Digital Assistants) and a portable telephone.

The pedometer 505 includes a communication unit 551, an acceleration detection unit 552, a display unit 553, a calculation unit 554, a power supply connection unit 555, a storage unit 556, an operation unit 557, and a power supply unit 558.

The communication unit 551 may be configured by an appropriate communication interface such as a wire line connecting USB (Universal Serial Bus) or a wirelessly communicating Bluetooth (registered trademark).

The acceleration detection unit 552 is a sensor for detecting acceleration as an example of change that occurs by walking etc, of the user, and transmits a detection signal to the calculation unit 554. The acceleration detection unit 552 may be configured by a one-dimensional acceleration sensor for detecting acceleration in one direction, a two-dimensional acceleration sensor for detecting acceleration in two directions orthogonal to each other, or a three-dimensional acceleration sensor for detecting acceleration in three directions orthogonal to each other, where the three-dimensional acceleration sensor having large amount of information is the most preferable.

The display unit 553 is configured by a display device such as a liquid crystal, and displays information according to a display control signal from the calculation unit 554. The information to display may be information related to walking such as number of steps.

The calculation unit 554 is driven by the power received from the power supply unit 558 through the power supply connection unit 555, and executes reception (detection) of the detection signal from the acceleration detection unit 552 and the operation unit 557, and the power supply (power supply) and the operation control (display control) with respect to the communication unit 551, the display unit 553 and the storage unit 556. The calculation unit 554 also executes a calculation process with reference to walking decision criterion data and walking validation criterion data stored in the storage unit 556 based on the detection signal received from the acceleration detection unit 552.

The storage unit 556 stores a number-of-step count program for detecting the signal portion by walking in the detection signal and counting the number of steps, threshold data for counting the number of steps, and the like. A message that differs by change in amount of exercise and by change in body composition may be stored in correspondence with the consumed calorie calculated using a consumed calorie correction coefficient α to be described later'(see FIG. 7).

The operation unit 557 accepts appropriate operation input such as an input operation of the user information including weight and stride, a date and time input operation of setting a clock, a display content switching operation of switching the display content to various contents including number of steps, consumed calories, and walking distance, and a data transmitting operation of transmitting data to the user terminal 504, and transmits the operation input signal to the calculation unit 554.

The body composition meter 707 is configured by a control unit 770, a communication unit 771, an operation unit 772, a display unit 773, a measurement unit 774, or the like.

The control unit 770 is configured by a CPU, a ROM, and a RAM or a microcomputer (microcomputer) and executes the control operation and the calculation operation of each unit according to the program stored in the ROM or the like.

The communication unit 771 is connected to the control unit 770, and carries out communication with the server 502 according to a control signal of the control unit 770. The communication unit 771 may be configured to communicate not only with the server 502 but also with appropriate devices such as other biological information acquiring devices such as the pedometer or to communicate with the personal computer and the portable information terminal (PDA or portable telephone, etc.).

The operation unit 772 is configured by a plurality of buttons to be push operated, and transmits the input information push operated by the user such as input of the user information including weight and height to the control unit 770.

The display unit 773 is configured by a display device such as a liquid crystal screen (see FIG. 1), and displays images such as characters and figures according to an image signal provided from the control unit 770.

The measurement unit 774 is configured by a body fat percentage measuring portion including a low current circuit, an impedance detector, and an electrode, and a weight measuring portion including a plurality of load cells.

The measurement data such as the base metabolism and weight measured with the body composition meter 707, the height input with the body composition meter 707, or the like are accumulated by users in the storage unit 521 of the server 502. The pedometer 505 can access the measurement data using a user ID, or the like.

Figure 2:
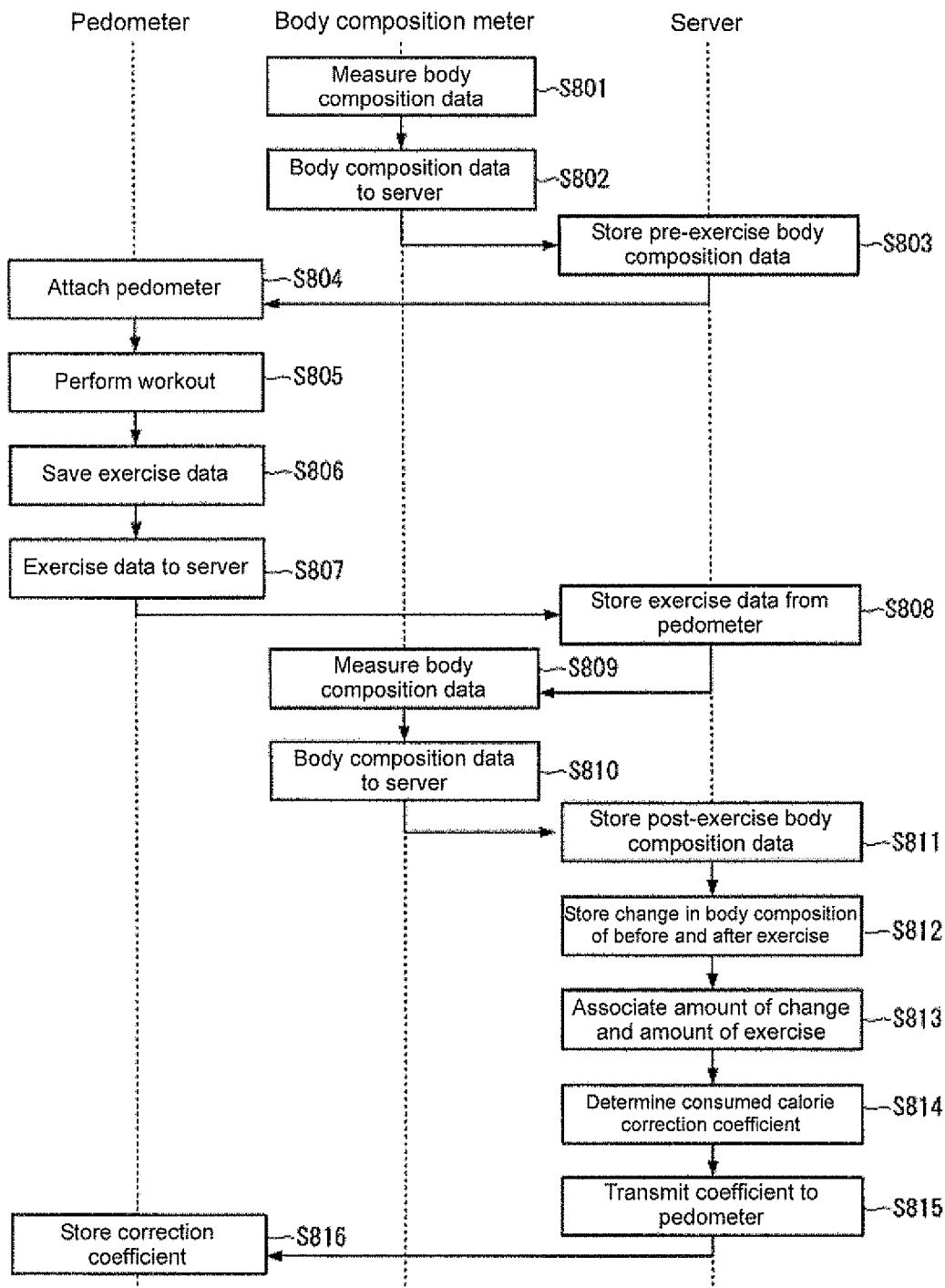
FIG. 2 is a flowchart showing the entire operation of the biological information acquiring system.

FIG. 2 is a flowchart showing the entire operation of the biological information acquiring system 700.

Figure 5:
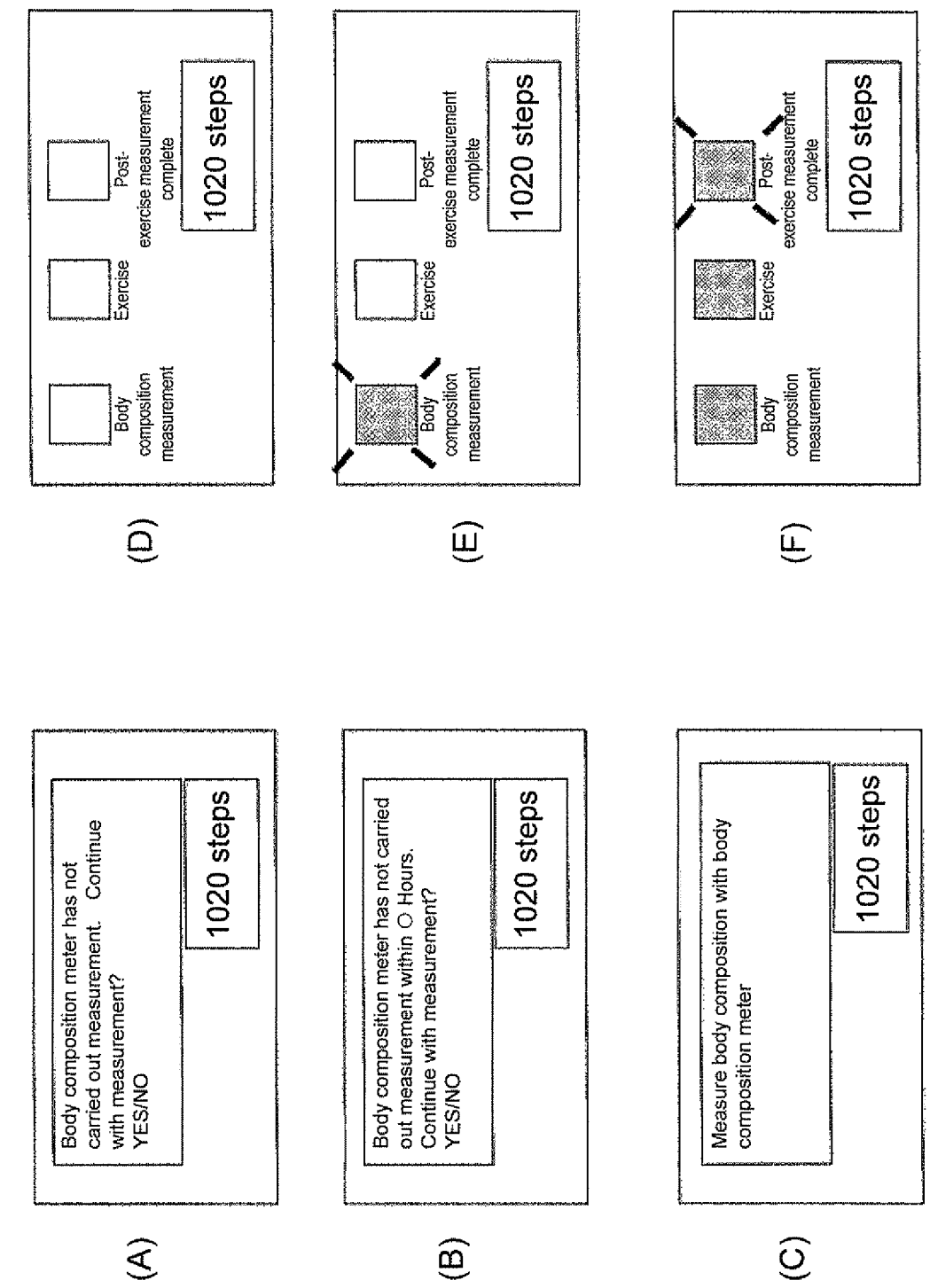
FIG. 5 is an explanatory view of a screen image of the pedometer.

Firstly, body composition data (weight and body composition data) is measured by the body composition meter 707 (step S801). The base metabolism, weight, body fat percentage, or the like is measured for the body composition data. As shown in FIG. 5(D), the pedometer 505 at this stage displays a state display screen on the display unit 553, and turns OFF all lighting of body composition measurement, exercise and post-exercise measurement complete thus indicating that nothing has started. The current number of steps is also preferably displayed at the same time.

The body composition meter 707 transmits the measured body composition data to the server 502 (step S802).

The server 502 stores the received body composition data in the storage unit 521 as pre-exercise body composition data (step S803)

The pedometer 505 receives the body composition data from the server 502 and is attached by the user (step S804), and then the workout is carried out (step S805). In this case, the pedometer 505 may detect the attachment or the carrying out of the workout, but the operation of detection or the like does not need to be particularly carried out.

The calculation unit 554 of the pedometer 505 that received the body composition data may display the state display screen shown in FIG. 5(E) on the display unit 553. In this screen, "body composition measurement" is displayed, and the remaining "exercise" and "post-exercise measurement complete" are turned OFF. Moreover, "exercise" of the state display screen may be further displayed during the exercise of detecting walking with the pedometer 505.

The pedometer 505 saves the exercise data by workout in the storage unit 556 (step S806), and transmits such exercise data to the server 502 (step S807). This transmission may be executed as needed, or may be executed when a constant time has elapsed after the termination of the workout (stop of walking etc.).

Upon such a transmission, the calculation unit 554 may display the state display screen on the display unit 553, as shown in FIG. 5(F). In such a state display screen, all of "body composition measurement", "exercise" and "post-exercise measurement complete" may be displayed.

The server 502 stores the exercise data received from the pedometer 505 in the storage unit 521 (step S808).

The body composition meter 707 measures the body composition of the user (step S809), and transmits the body composition data to the server 502 (step S810).

The server 502 stores the received body composition data in the storage unit 521 as the post-exercise body composition data (step S811).

The server 502 obtains the change in body composition of before and after the exercise from the difference in the pre-exercise body composition data stored in step S803 and the post-exercise body composition data stored in step S811 and stores the amount of change in the storage unit 521 (step S812), and associates the amount of change with the amount of exercise (step S813).

The server 502 determines a consumed calorie correction coefficient α (step S814), and transmits the consumed calorie correction coefficient α to the pedometer 505 (step S815). The consumed calorie correction coefficient α is provided to calculate the consumed calorie for every user using the calculation method shown in FIG. 6 to be described later.

The pedometer 505 stores the received consumed calorie correction coefficient α (step S816), and terminates the process. The pedometer 505 that received the consumed calorie correction coefficient α uses such a consumed calorie correction coefficient α when calculating the consumed calorie for every user thereafter.

Figure 3:
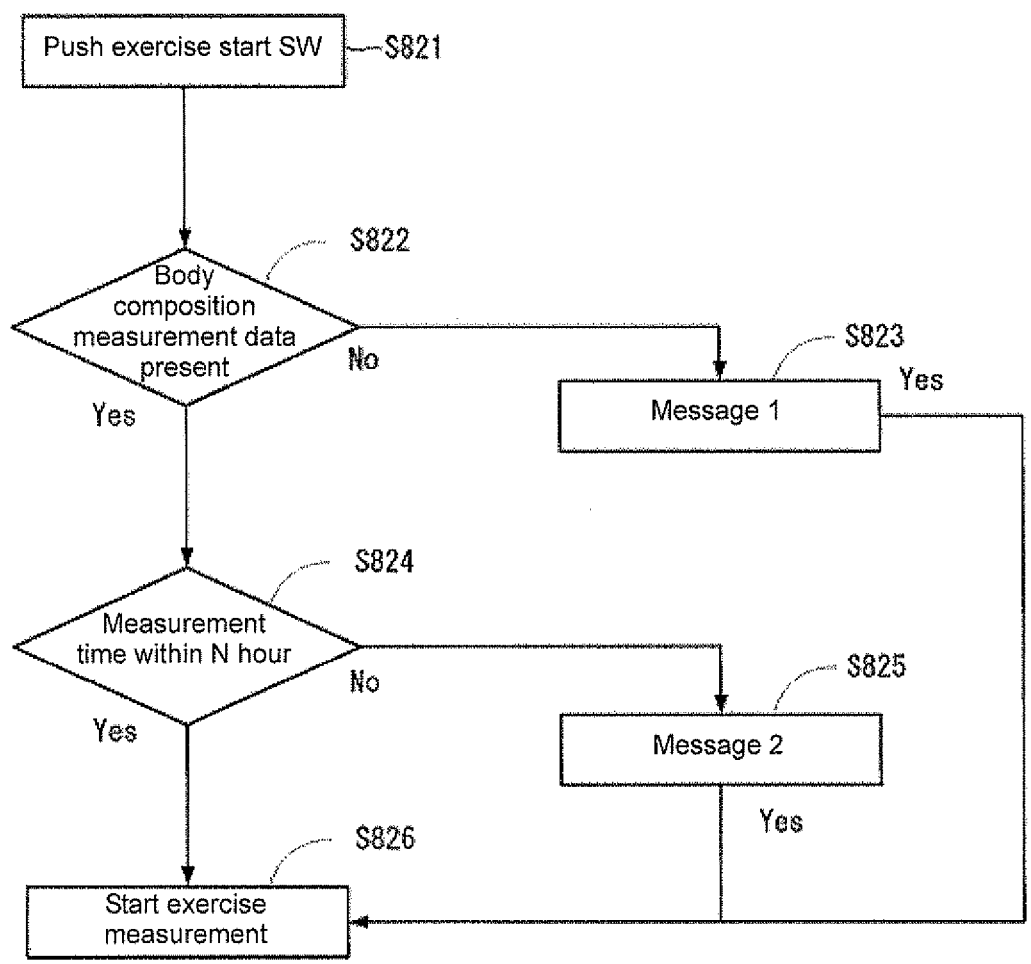
FIG. 3 is a flowchart of the operation of a pedometer including an exercise start switch.

FIG. 3 is a flowchart showing the operation executed by the calculation unit 554 of the pedometer 505 in which an exercise start switch is arranged in the operation unit 557. This operation is executed in the attachment of step S804.

The calculation unit 554 accepts the pushing input of the exercise start switch by the operation unit 557 (step S821), and determines whether or not there is data of the body composition meter 707 (step S822). This determination is made through an appropriate method such as accessing the server 502 and determining whether or not there is measurement data of the body composition meter 707, or determining whether or not the measurement data is received with an immediate constant time from the server 502.

If the measurement data is not present (step S822: No), the calculation unit 554 displays a warning screen shown in FIG. 5(A) on the display unit 553 (step S823). This warning screen displays the fact that the measurement by the body composition meter is not carried out, the content inquiring whether to carry out the measurement as is, the content causing the selection of Yes/No, and the current number of steps (1020 steps in the illustrated example).

The calculation unit 554 starts the exercise measurement by the pedometer 505 if Yes is selected (step S826).

If the measurement data by the body composition meter 707 is present (step S822: Yes), the calculation unit 554 determines whether or not the measurement time of such measurement data is within a predetermined time (N hour) defined in advance from the current time point (step S824).

If not within a predetermined time (step S824: No), the calculation unit 554 displays a warning screen shown in FIG. 5(B) on the display unit 553 (step S825). This warning screen displays the fact that the measurement by the body composition meter is not carried out within a predetermined time (O hour), the content inquiring whether to carry out the measurement as is, the content causing the selection of Yes/No, and the current number of steps (1020 steps in the illustrated example).

If Yes is selected, the calculation unit 554 starts the exercise measurement by the pedometer 505 (step S826). If No is selected, a warning screen shown in FIG. 5(C) is displayed on the display unit 553. In the warning screen, the content urging to measure the body composition with the body composition meter, and the current number of steps (1020 steps in the illustrated example) are displayed.

If within a predetermined time (step S824: Yes), the calculation unit 554 starts the exercise measurement by the pedometer 505 (step S826).

Figure 4:
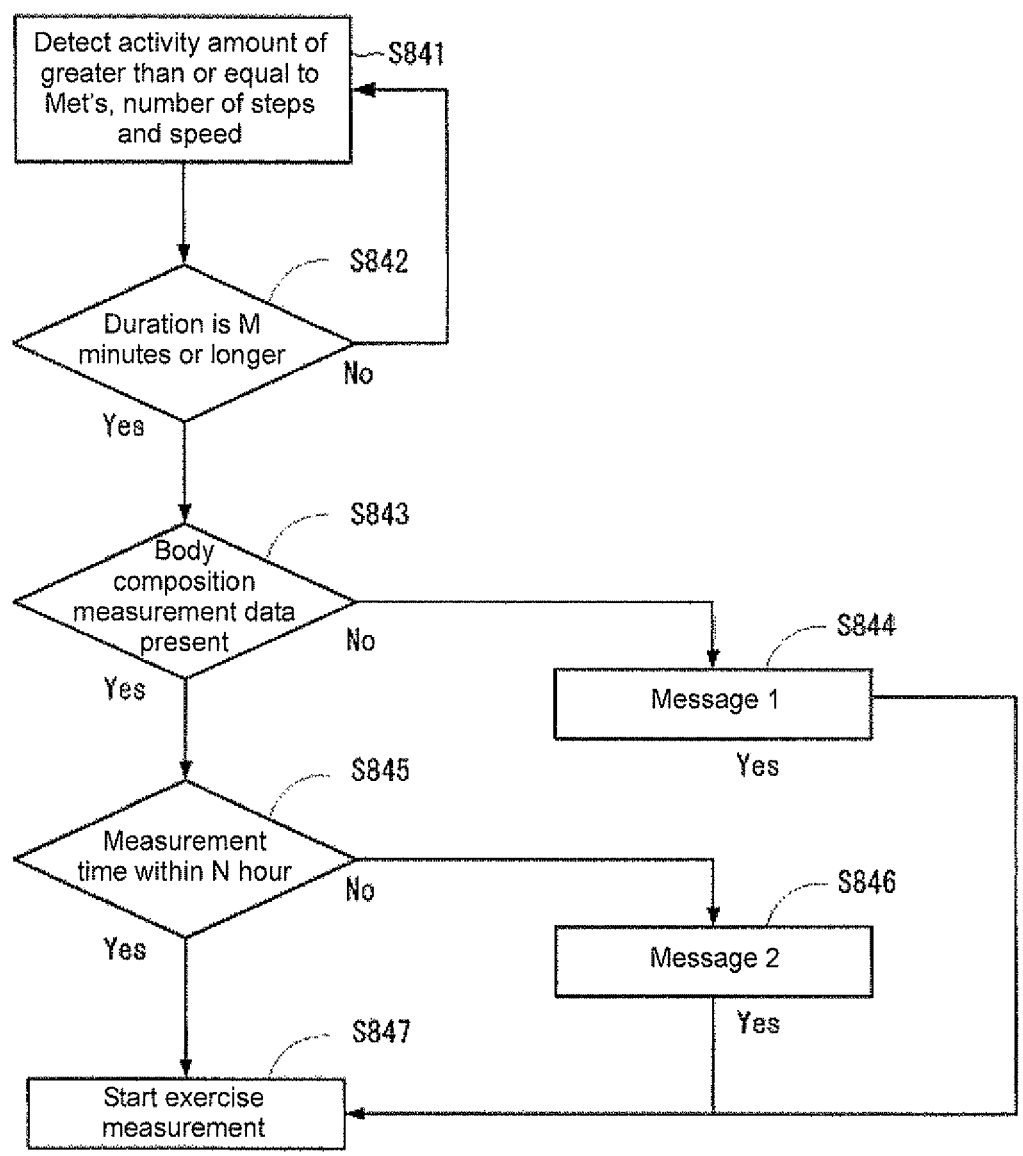
FIG. 4 is a flowchart showing another operation of the pedometer including an exercise start switch.

FIG. 4 is a flowchart showing the operation of another example executed by the calculation unit 554 of the pedometer 505 in which the exercise start switch is arranged in the operation unit 557. In such an example, the exercise is automatically detected.

If a predetermined amount of exercise or more is detected from the Met's, the number of steps, and the speed (step S841), the calculation unit 554 waits until the duration becomes longer than or equal to a predetermined time (for M minutes in the illustrated example(step S842: No).

If a predetermined amount of exercise or more is detected continuously for a predetermined time or longer (step S842: Yes), the calculation unit 554 determines whether or not the measurement data by the body composition meter 707 is present (step S843). The operation from steps S843 to S847 is the same as the operation from steps S822 to S826, and thus the detailed description will not be repeated.

Figure 6:
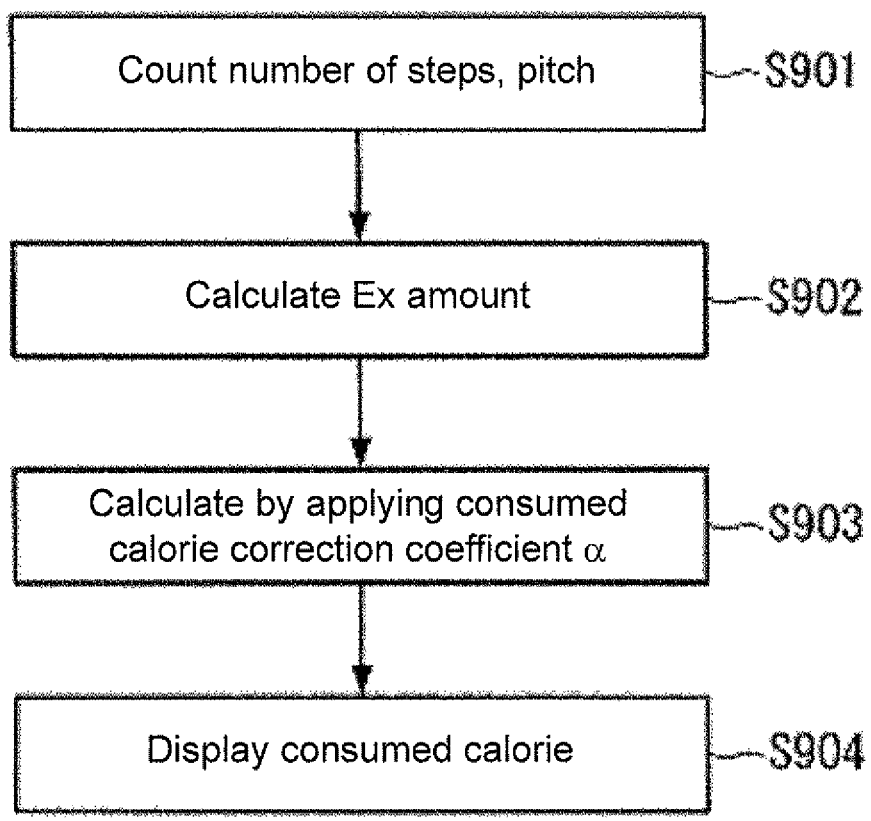
FIG. 6 is a flowchart of the operation of calculating consumed calories.

FIG. 6 is a flowchart of the operation of calculating the consumed calorie based on the correction coefficient $\alpha$ after calculating the consumed calorie correction coefficient $\alpha$.

Specifically describing, the calculation unit 554 of the pedometer 505 counts the number of steps and the pitch of the user with the pedometer 505 (step S901), and calculates the Ex amount (amount of exercise) of the user based on such number of steps and pitch using the normal calculation method (step S902).

The calculation unit 554 multiplies the consumed calorie correction coefficient $\alpha$ obtained with equation 1 to the consumed calorie of the user calculated with the normal calculation method to calculate the correction consumed calorie for every user (step S903).

The correction consumed calorie is obtained with the following equation 1.

[Equation 1]

$$\text{Correction consumed calorie } (ka1) = \text{consumed calorie } (kal) \times \text{consumed calorie correction coefficient } \alpha \quad \text{equation 1}$$

The consumed calorie correction coefficient $\alpha$ is obtained with the following equation 2.

[Equation 2]

$$\text{If reference change weight } X \leq 0.5, \alpha = 1.0$$

$$\text{If reference change weight } X > 0.5, \alpha = 1.0 + 0.1(X - 0.5) \quad \text{equation 2}$$

The reference change weight X of the user is obtained with the following equation 3.

[Equation 3]

$$\text{Reference change weight } X = 3 \div \text{actual amount of exercise } (Ex) \times \text{change of weight (kg)} \quad \text{equation 3}$$

The calculation unit 554 displays the consumed calorie calculated with the calculation method on the display unit 553 of the pedometer 505 (step S904).

The consumed calorie for every user can be calculated in such a manner.

The following table 1 is an example in which change in weight at the time of the actual exercise is converted from the change in weight of before and after the workout.

TABLE 1

| Date | Date | Amount of exercise (Ex) | Weight loss (kg) | | Unit amount of exercise (Ex/kg) | Average value (kg) |
|---|---|---|---|---|---|---|
| a | 10/9 | 3 | 0.5 | → | 6.0 | 5.8(Ex 1) |
| b | 10/1 | 2 | 0.5 | | 4.0 | |
| c | 9/19 | 5 | 1.0 | | 5.0 | |
| d | 9/10 | 4 | 0.5 | | 8.0 | |

If the actual amount of exercise is 3Ex and the change in weight is 0.5 kg, the reference change weight X obtained with equation 3 becomes 0.5.

If the actual amount of exercise is 1.5Ex and the change in weight is 0.5 kg, the reference change weight X obtained with equation 3 becomes 1.0.

If the actual amount of exercise is 4Ex and the change in weight is 0.4 kg, the reference change weight X obtained with equation 3 becomes 0.3.

If an average value of the reference change weight X is smaller than or equal to 0.5, the consumed calorie correction coefficient α is set to 1.0.

If an average value of the reference change weight X is greater than or equal to 0.5, the consumed calorie correction coefficient α is set to a coefficient obtained with equation 2 of 1.0+0.1(X−0.5).

The reference change weight X is determined, and the consumed calorie correction coefficient α is determined based on the change in measured weight.

For other calculation methods, the consumed calorie correction coefficient β, to be described later, is used instead of using the consumed calorie correction coefficient α to calculate the consumed calorie for every user based on the body composition.

The correction consumed calorie can be calculated for every user by multiplying the consumed calorie correction coefficient β based on the reference change fat percentage Y obtained with equation 4 to the consumed calorie of the user calculated with the normal calculation method. The results substantially similar to when calculated with the consumed calorie correction coefficient α are obtained The consumed calorie correction coefficient β is obtained with the following equation 4.

[Equation 4]

If Reference change fat percentage $Y \leq 0.5$, $\beta=1.0$

If reference change fat percentage $Y>0.5$, $\beta=1.0+0.1(Y-0.5)$  equation 4

The reference change fat percentage Y is obtained with the following equation 5.

[Equation 5]

Reference change fat percentage $Y=3 \div$ actual amount of exercise × change of fat percentage  equation 5

The following table 2 is an example in which change in body composition in the actual amount of exercise is converted from the change in body composition (muscle percentage or fat percentage) of before and after the workout.

TABLE 2

| | Actual amount of exercise | Change in fat percentage | Reference change fat percentage (Y) |
|---|---|---|---|
| 1 | 3Ex | 0.5% | 0.5% |
| 2 | 1.5Ex | 0.5% | 1.0% |
| 3 | 4Ex | 0.4 kg | 0.3% |

If the actual amount of exercise is 3Ex and the change in fat percentage is 0.5%, the reference change fat percentage Y obtained with equation 3 becomes 0.5%.

If the actual amount of exercise is 1.5Ex and the change in fat percentage is 0.5%, the reference change fat percentage Y obtained with equation 3 becomes 1.0%.

If the actual amount of exercise is 4Ex and the change in fat percentage is 0.4%, the reference change fat percentage Y obtained with equation 3 becomes 0.3%.

If an average value of the reference change fat percentage Y is smaller than or equal to 0.5, the consumed calorie correction coefficient β is set to 1.0.

If an average value of the reference change fat percentage Y is greater than or equal to 0.5, the consumed calorie correction coefficient β is set to a coefficient obtained with equation 4 of 1.0+0.1(Y−0.5).

The reference change fat percentage Y can be determined in such a manner based on the body composition.

The process of displaying a message with respect to the result of exercise or the like of the user will now be described.

FIG. 7 is an explanatory view showing message data stored in the storage unit 556 of the pedometer 505.

The message data is configured by change in weight, change in amount of exercise, and message. One of the three stages of increase, maintain, and decrease is stored for the change in weight and the change in amount of exercise. A message corresponding to the change in weight and the change in amount of exercise can be displayed.

FIG. 8 is a graph showing a relationship of the change in weight and the amount of exercise when dieting while looking at the message displayed on the display unit 553.

The upper level in the figure shows a case of successful diet. Here, the a zone is a zone in which the exercise just started and thus the weight decreases steadily with increase in the amount of exercise.

In this case, a message "weight is steadily dropping, continue to keep up good work" is displayed on the display unit 553 when the weight and the body composition of the user are measured with the biological information acquiring system 700.

The user then can recognize whether or not the amount of exercise is suited to reach or maintain the target value, and continuation of diet restriction and exercise can be recommended to the user.

If the exercise is maintained or continued according to such a message, a great change is not seen in the weight nor the amount of exercise in the b zone, which is a period in which the body enters an energy saving mode and the decrease in weight temporarily retains.

In this case, a message "body is in an energy saving mode, continue with exercise" is displayed on the display unit 553 when the measurement is carried out by the biological information acquiring system 700.

The user then can recognize that the exercise needs to be continued or increased in order to reach the target value.

Furthermore, the weight again decreases in a c zone by increasing (enhance the quality of exercise) or maintaining the amount of exercise according to the message displayed on the display unit 553.

The diet thus becomes successful.

The lower level in the figure shows a case of failed diet. Here, the d zone is a zone in which the exercise just started, and thus a result similar to the a zone is obtained, where the weight decreases steadily with increase in the amount of exercise.

However, when entering the e zone, the body enters the energy saving mode and the decrease in weight temporarily retains. In this case, the motivation of the user lowers, and the weight starts to increase as the amount of exercise becomes less.

Furthermore, in the f zone, the weight further increases if the amount of exercise is further reduced from the e zone. In some cases, the weight may become greater than before starting the diet due to rebound.

If a situation that may lead to failure in diet occurs, diet can be made successful by displaying a message such as in the successful diet example.

The message is displayed based on the change in weight in the above example, but the message may be displayed based on the change in fat percentage.

Figure 9:
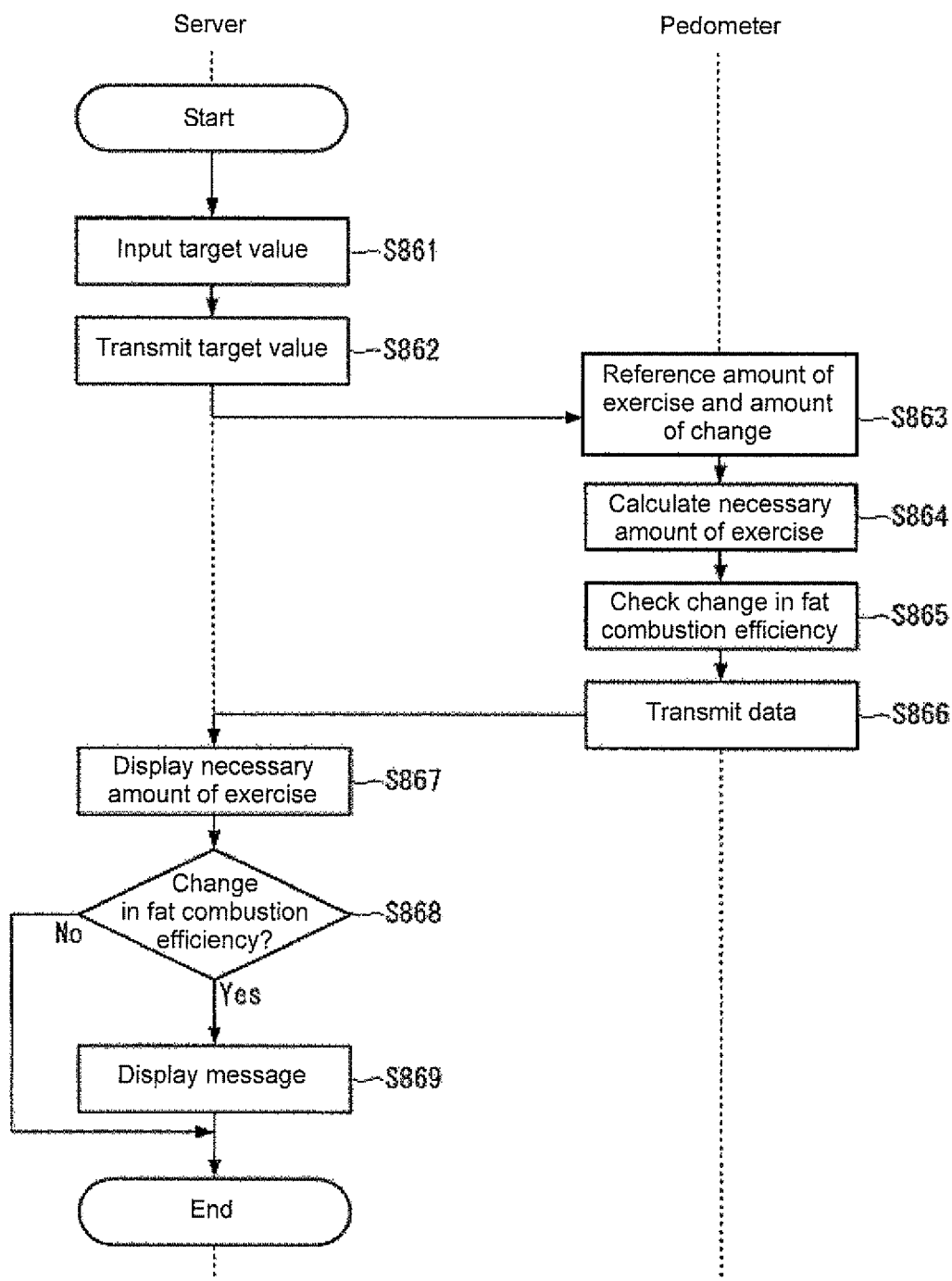
FIG. 9 is a flowchart of the operation for outputting the necessary amount of exercise from the target value input.

FIG. 9 is a flowchart showing the operation when the target value is input so that the user recognizes the necessary amount of exercise.

The calculation unit 554 of the pedometer 505 accepts the target value input corresponding to the consumed calorie calculated using the consumed calorie correction coefficient α by the user by the operation unit 557 (step S861).

The target value can be accepted by having the user specify and input the target item (subcutaneous fat, weight, etc.) and the target numerical value (percent, kilogram, etc.), and an appropriate target value such as "drop 1% of subcutaneous fat" or "drop 1 kg of weight" can be set.

The calculation unit 554 transmits the input target value to the server 502 by the communication unit 551 (step S862).

The control unit 520 of the server 502 references the data stored in the storage unit 521, and extracts the past amount of exercise and amount of change of the user who transmitted the data from the pedometer 505 (step S863). The amount of exercise and the amount of change are stored in step S812.

The control unit 520 executes the necessary amount of exercise calculation process for calculating the amount of exercise necessary to reach the received target value based on the amount of exercise and the amount of change stored immediately before (step S864).

The control unit 520 further checks whether or not there is change in fat combustion efficiency from the past history of the amount of exercise and the amount of change (step S865). This can be obtained from the relationship of the amount of exercise and the amount of change, and for example, change such as less amount of change with same amount of exercise can be recognized.

The control unit 520 data transmits the necessary amount of exercise obtained in step S864 and the change in fat combustion efficiency obtained in step S865 to the pedometer 505 (step S866).

The calculation unit 554 of the pedometer 505 displays the amount of exercise necessary for achieving the target value on the display unit 553 based on the received data (step S867).

That is, when the user inputs the target value of the diet that is the target of the user to the pedometer 505, the amount of exercise necessary to reach such target value is displayed on the display unit 553.

The display content may be such that a message including "carry out for 60 minutes or longer walking maintenance of 3 Met's or greater" with respect to the user having high visceral fat, "carry out for 30 minutes or longer walking maintenance of 4 Met's or greater" with respect to the user having subcutaneous fat, and "carry out for 3 minutes walking of 3 Met's or greater and 10 minutes walking of 4 Met's or greater" with respect to the user who wants to lose weight is displayed.

If the change in the fat combustion efficiency is recognized from the data received from the server 502 (step S868: Yes), the calculation unit 554 displays on the display unit 553 a message (see FIG. 7) corresponding to the change in weight and the change in the amount of exercise (step S869).

This message may be of an appropriate content such as "fat combustion efficiency is dropping, change quality of exercise and try to increase muscle" if the weight loss stopped or the muscle percentage lowered although the amount of exercise is not reduced, or "continuation is important to promote fat combustion, continue to try without quitting" if the weight loss stopped although the amount of exercise is increased or the muscle percentage increased.

If there is no change in the fat combustion efficiency (step S868: No), step S869 is not executed and the process is terminated.

In the necessary amount of exercise calculation process, the necessary amount of exercise may be calculated from the average amount of exercise Ex necessary to drop 1 kg of weight and the target value.

Figure 10:
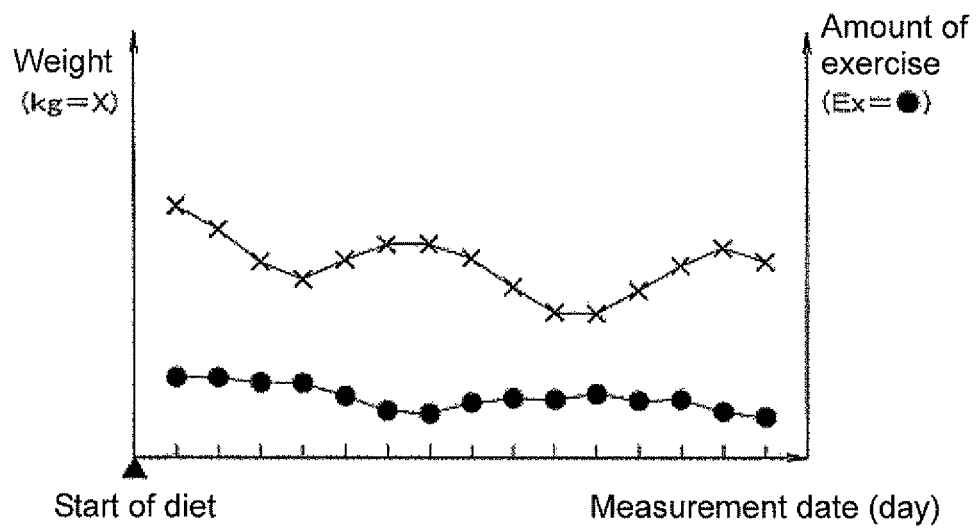
FIG. 10 is a graph showing the relationship of the change in weight and the amount of exercise during the diet.

Specifically, table 3 below is a table, in which the data of the day the weight dropped are picked up with reference to the past measurement result shown in the graph of FIG. 10, showing the amount of exercise Ex and the reduced weight kg of the relevant day, the unit amount of exercise Ex/kg converted to the amount for dropping 1 kg, and the average amount of exercise Ex1 of the entire unit amount of exercise.

TABLE 3

| | Actual amount of exercise | Change in weight | Reference change weight (X) |
| --- | --- | --- | --- |
| 1 | 3Ex | 0.5 kg | 0.5 |
| 2 | 1.5Ex | 0.5 kg | 1.0 |
| 3 | 4Ex | 0.4 kg | 0.3 |

That is, the amount of exercise Ex and the weight kg of the picked up day when the weight dropped are converted to the unit amount of exercise Ex/kg of the amount necessary to reduce 1 kg. The average amount of exercise Ex1 is calculated from the unit amount of exercise of all picked up data. The necessary amount of exercise can be calculated by converting the average amount of exercise Ex1 to the target value to reduce.

The calculation unit 554 of the pedometer 505 that finished the calculation displays "exercise of OO Ex is necessary to lose OO of your weight" on the screen of the display unit 553.

Therefore, the user can accurately grasp the amount of exercise when reducing the weight by the target value by looking at the numerical value of the OO Ex displayed on the screen of the display unit 553. Furthermore, the exercise does not need to be carried out more than necessary and the weight can be comfortably reduced since the amount of exercise necessary to achieve the target can be known. The lack of exercise for reaching the target value can be prevented, and the period until reaching the target can be shortened.

As described above, in the biological information acquiring system 700, the body composition meter 707 is configured to acquire the pre-exercise body composition data measured before the start of exercise and the post-exercise body composition data measured after the end of exercise, and the pedometer 505 is configured to acquire the vibration data during the exercise, and includes consumed calorie correction coefficient acquiring means (calculation unit 554 that executes step S816) for acquiring the consumed calorie correction coefficient α based on the pre-exercise body composition data, the post-exercise body composition data, and the vibration data, and consumed calorie calculation means (calculation unit 554 that calculates consumed calorie) for calculating the consumed calorie using the consumed calorie correction coefficient α, so that the consumed calorie of the user can be more accurately calculated.

An appropriate advice may be offered to the user by arranging amount of change calculation means (control unit 520 that executes step S812) for obtaining the amount of change from the difference between the pre-exercise body composition data and the post-exercise body composition data, input means (operation unit 557) for permitting input of a target value corresponding to the consumed calorie calculated using the consumed calorie correction coefficient α that is the target of the user, and a proposing means (calculation unit 554 that executes step S867) for proposing the exercise necessary for reaching the target value based on the obtained target value and the vibration data during the exercise.

The accuracy of the consumed calorie calculated by the pedometer 505 can be enhanced using the measurement value measured with other devices. In particular, the cost incurred on the user can be suppressed and a better measurement can be carried out by using the body composition meter 707 widely used in general households.

The measurement by the body composition meter 707 may be carried out before and after the exercise, and the correction coefficient can be updated by simply attaching the pedometer 505 to the user and performing exercise. Therefore, the correction coefficient for enhancing the calculation accuracy of the consumed calorie can be easily updated to that which complies with the current state of the user.

The user can perform exercise with a sense of purpose since the necessary mount of exercise can be obtained by inputting the target value.

Furthermore, when the fat combustion efficiency is changed, the user is able to know about such a fact and can use it to maintain the motivation to continue the exercise.

There is provided a biological information acquiring method for acquiring a consumed calorie correction coefficient α with consumed calorie correction coefficient acquiring means (calculation unit 554 that executes step S816) based on pre-exercise body composition data measured before the start of exercise and post-exercise body composition data measured after the end of exercise acquired with a body composition meter 707 and vibration data during exercise acquired with a pedometer 505 and calculating a consumed calorie using the consumed calorie correction coefficient α with consumed calorie calculation means (calculation unit 554 that calculates consumed calorie) using a biological information acquiring system 700.

It may be displayed that an exercise of 5.8 Ex is necessary to lose 1 kg of weight.

In the correspondence of the configuration of the present invention and the embodiment described above, vibration data acquiring means, consumed calorie correction coefficient acquiring means, consumed calorie calculation means, amount of exercise calculation means and selection means of the present invention correspond to the calculation unit 554 in the example; and similarly, exercise effect information corresponds to change in consumed calorie, body composition before and after exercise, or weight;

weight and body composition acquiring means corresponds to the server 502;

amount of exercise measurement device corresponds to the pedometer 505;

output means corresponds to the display unit 553;
storage means corresponds to the storage unit 556;
input means corresponds to the operation unit 557; and
weight and body composition meter corresponds to the body composition meter 707.

The present invention is not limited solely to the configuration of the embodiment described above, and can be applied based on the technical concept described in the Claims to obtain a great number of embodiments.

INDUSTRIAL APPLICABILITY

The present invention can be used to detect the amount of exercise and the change in weight and body composition due to such an exercise to grasp the exercise effect, and can be used to support diet, support rehabilitation and nursing care, player training by sports instructor, or the like.

DESCRIPTION OF SYMBOLS

502 server
505 pedometer
553 display unit
554 calculation unit
556 storage unit
557 operation unit
700 biological information acquiring system
707 body composition meter

The invention claimed is:

1. A biological information acquiring system including an amount of exercise measurement device with a vibration data acquiring unit that acquires vibration data in which vibration by body motion is detected, and a weight and body composition meter with weight and a body composition acquiring unit that acquires weight and body composition; wherein
   the weight and body composition meter is configured to acquire pre-exercise weight and body composition data measured before start of exercise and post-exercise weight and body composition data measured after end of exercise;
   the amount of exercise measurement device is configured to acquire the vibration data during exercise; and
   the biological information acquiring system further comprises:
   a calculation unit that calculates exercise effect information indicating effect of exercise based on the pre-exercise weight and body composition data, the post-exercise weight and body composition data, and the vibration data.

2. The biological information acquiring system according to claim 1, further comprising:
   a storage unit that stores different messages by change in an amount of exercise and by change in body composition in correspondence with the exercise effect information calculated by the calculation unit;
   a selection unit that selects a message corresponding to change in the amount of exercise and the body composition from the storage unit; and
   an output unit that outputs the message selected by the selection unit.

3. The biological information acquiring system according to claim 1, wherein
   the exercise effect information is consumed calorie consumed in the exercise; and
   the biological information acquiring system further comprises:
   a consumed calorie correction coefficient acquiring unit that acquires a consumed calorie correction coefficient based on the pre-exercise weight and body composition data, the post-exercise weight and body composition data, and the vibration data, and
   a consumed calorie calculation unit that calculates the consumed calorie using the consumed calorie correction coefficient.

4. The biological information acquiring system according to claim 1, further comprising:
   an input unit that permits input of a target value corresponding to the exercise effect information; and
   an amount of exercise calculation unit that calculates an amount of exercise corresponding to the target value.

5. A biological information acquiring method comprising the steps of:
   acquiring with an amount of exercise measurement device vibration data in which vibration by body motion is detected:
   acquiring with a weight and body composition meter weight and body composition; and
   calculating with a calculation unit exercise effect information for calculating exercise effect information indicating effect of exercise based on pre-exercise weight and body composition data measured before start of exercise and post-exercise weight and body composition data measured after end of exercise acquired by the weight and body composition meter, and the vibration data during exercise acquired by the amount of exercise measurement device.

6. The biological information acquiring method according to claim 5, further comprising the steps of:
  storing in a storage unit different messages by change in an amount of exercise and by change in body composition in correspondence with the exercise effect information calculated by the calculation unit;
  selecting with a selection unit a message corresponding to change in the amount of exercise and the body composition stored in the storage unit; and
  outputting with an output unit the message selected by the selection unit.

7. The biological information acquiring method according to claim 5, further comprising the steps of:
  permitting with an input unit input of a target value corresponding to the exercise effect information; and
  calculating with an amount of exercise calculation unit an amount of exercise corresponding to the target value.

* * * * *